Jan. 27, 1931.         O. L. KIENTZ            1,790,309
                      AEROPLANE WING
               Filed July 22, 1929     3 Sheets-Sheet 2
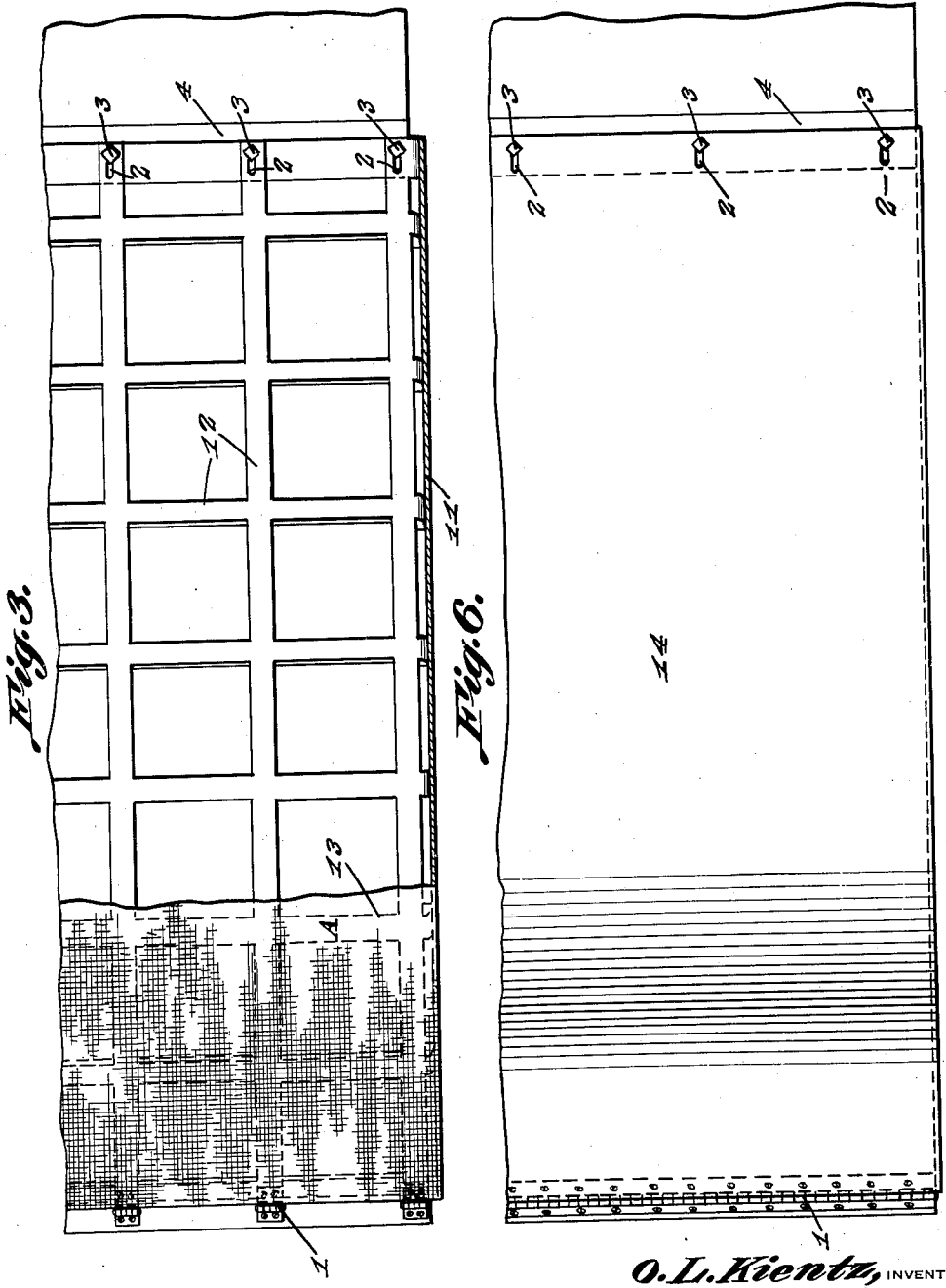

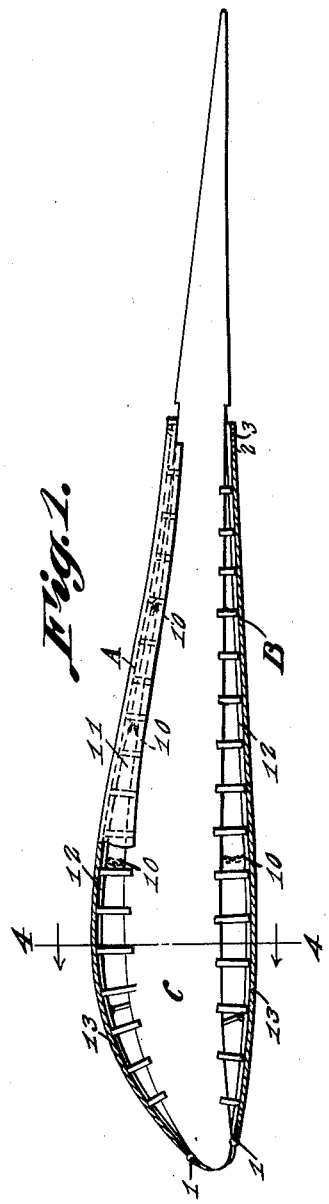
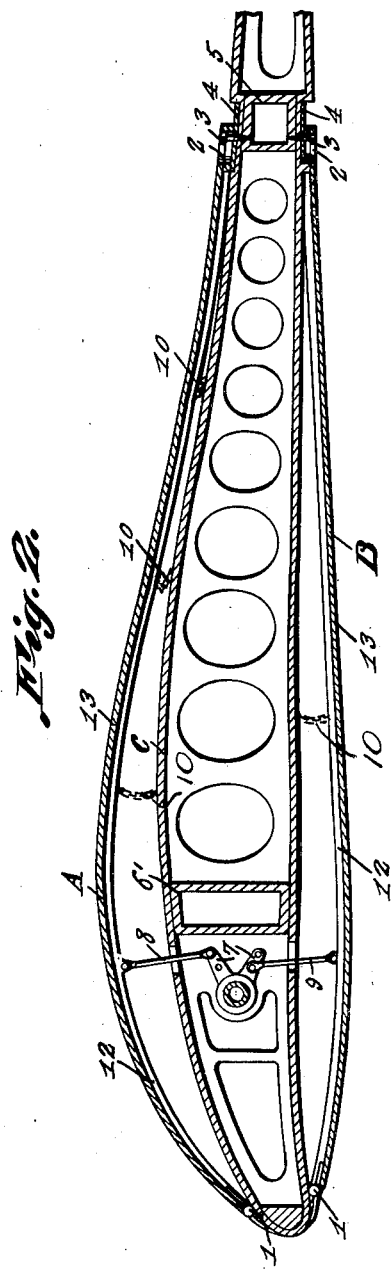

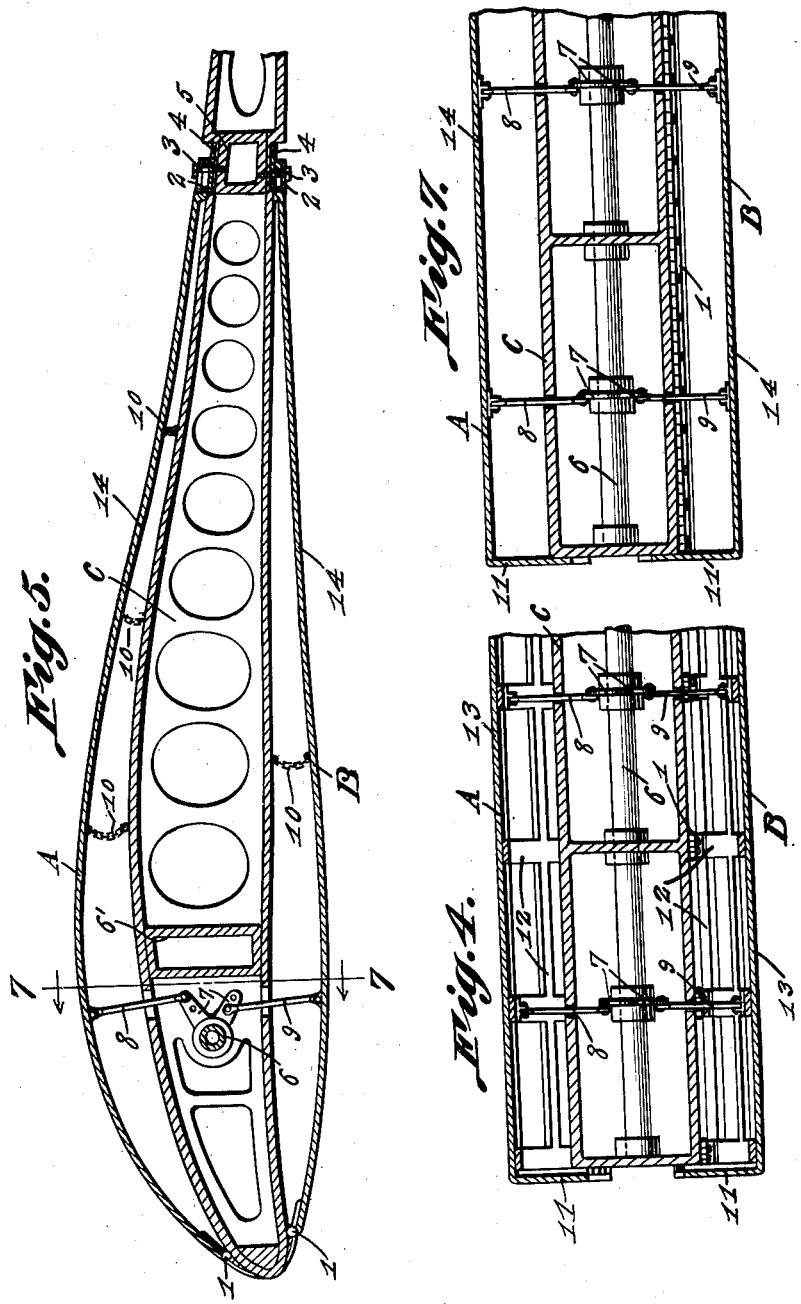

Patented Jan. 27, 1931

1,790,309

UNITED STATES PATENT OFFICE

OTTO L. KIENTZ, OF MERIDEN, KANSAS

AEROPLANE WING

Application filed July 22, 1929. Serial No. 380,075.

This invention relates to a variable camber wing for aeroplanes, the general object of the invention being to provide a flexible cover for the upper and lower surfaces of the wing, with means for adjusting said covers toward and away from the wing so as to increase and decrease the thickness of the wing, thus enabling the wing to have a greater camber when the craft is taking off or landing and when the craft is in flight, the covers are manipulated to give the wing its normal streamline shape, which permits the craft to travel at great speed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an end view of a wing constructed in accordance with this invention, parts being broken away.—

Figure 2 is a longitudinal sectional view of the improved wing.

Figure 3 is a fragmentary plan view with parts broken away, showing the cover formed of a framework covered with cloth or the like.

Figure 4 is a section on line 4—4 of Figure 1.

Figure 5 is a view similar to Figure 2, but showing the covers formed of metal.

Figure 6 is a fragmentary plan view of Figure 5.

Figure 7 is a section on line 7—7 of Figure 5.

As shown in these views, I provide an upper cover A and a lower cover B for the wing C of the plane, these covers being hingedly connected at their front with the nose of the wing, as shown at 1, and the rear part of each cover is formed with a plurality of slots 2 through which bolts 3 or the like pass, these bolts also passing through the strips 4 into the rear spar 5 of the wing. Each cover has a certain amount of flexibility so that it can be flexed and when the cover is moved away from the wing, the rear end thereof slides on the plate 4, the slots 2 through which the bolts 3 pass permitting this movement. A tubular shaft 6 passes through the wing in front of the front spar 6' thereof, and said shaft has a plurality of arms 7 thereon which are connected by the links 8 and 9 with the upper and lower covers. This shaft 6 is adapted to be rocked from suitable means placed in the cockpit so that the pilot can raise or lower the covers as he desires. As shown, the parts are so arranged that both the members A and B are moved in the same direction when the shaft is rocked, but the member A is moved to a greater extent than the member B, due to the fact that the link 8 is connected to the end of its arm 7, while the link 9 is connected to its arm intermediate the ends of the arm. Thus both the members A and B are moved upwardly together when the shaft is rocked in one direction and downwardly when the shaft is rocked in the opposite direction. Chains 10 or the like connect the covers with the wing and act as safety means to prevent undue movement of the covers.

From the foregoing it will be seen that the camber of the wing can be readily changed by raising or lowering the covers so that the wing can be increased in thickness when the craft is to land or take off, this additional thickness acting to increase the lifting action and reduce the speed. After the craft is in the air, the covers are moved in a reverse direction so as to decrease the camber and give the wing its normal streamlines so as to increase the speed of the craft. The means for slidably connecting the rear edges of the covers with the rear part of the wing not only permits movement of the covers, but also makes a water-tight joint at these points. The ends of the cover overlap the ends of the wings, as shown at 11, so that the spaces between the covers and the surfaces of the wings are closed by these portions 11.

Each cover may be formed of a light frame 12 covered with wing material 13, as shown in Figures 1, 2, 3 and 4, or the covers may be formed of thin metal, as shown at 14 in Figures 5, 6 and 7. The movement of the top cover should be equal to about 40% of the diameter of the stationary rib of the wing and the top cover should have approximately 30% greater movement than the lower one. As will be seen, when the top cover is raised to give the wing a greater camber the lower cover is also raised, giving the wing a slight under camber.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An aeroplane wing comprising upper and lower flexible covers, means for hingedly connecting the front edge of each cover to the nose of the wing, means for slidably connecting the rear edge of each cover to the wing and means for raising and lowering the covers simultaneously.

2. An aeroplane wing comprising upper and lower flexible covers, means for hingedly connecting the front edge of each cover to the nose of the wing, means for slidably connecting the rear edge of each cover to the wing, means for raising and lowering the covers simultaneously, such means comprising a shaft rotatably supported in the wing and operated by the pilot, arms on the shaft and links connecting the arms with the upper and lower covers.

3. An aeroplane wing comprising upper and lower flexible covers, means for hingedly connecting the front edge of each cover to the nose of the wing, means for slidably connecting the rear edge of each cover to the wing, means for raising and lowering the covers simultaneously, such means comprising a shaft rotatably supported in the wing and operated by the pilot, arms on the shaft, links connecting the arms with the upper and lower covers and flexible members connecting each cover with a part of the wing.

4. In an aeroplane wing, a flexible cover hingedly connected with the nose of the wing and extending rearwardly over the major portion of the wing, the rear edge of the cover having slots therein, fastening means carried by the rear part of the wing and passing through the slots, a lower cover of flexible material having its front edge hingedly connected with the under part of the nose of the wing and having slots in its rear edge, fastening means carried by the rear part of the wing and passing through said slots and means for raising and lowering the covers simultaneously.

In testimony whereof I affix my signature.

OTTO L. KIENTZ.